United States Patent
Liang et al.

(10) Patent No.: US 9,690,352 B2
(45) Date of Patent: Jun. 27, 2017

(54) PORTABLE ELECTRONIC DEVICE AND POWER CONTROL METHOD THEREFOR

(71) Applicant: HTC Corporation, Taoyuan, Taoyuan County (TW)

(72) Inventors: Yu-Hsin Liang, Taoyuan (TW); Jing-Jo Bei, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 81 days.

(21) Appl. No.: 14/564,782

(22) Filed: Dec. 9, 2014

(65) Prior Publication Data
US 2016/0162002 A1 Jun. 9, 2016

(51) Int. Cl.
  *G06F 1/32* (2006.01)
  *G06F 21/32* (2013.01)

(52) U.S. Cl.
  CPC .......... *G06F 1/3206* (2013.01); *G06F 1/3203* (2013.01); *G06F 1/3231* (2013.01); *Y02B 60/50* (2013.01)

(58) Field of Classification Search
  CPC .... G06F 1/3206; G06F 1/3203; G06F 1/3231; Y02B 60/50
  See application file for complete search history.

(56) References Cited

U.S. PATENT DOCUMENTS

| | | | | |
|---|---|---|---|---|
| 8,706,172 B2* | 4/2014 | Priyantha | .......... | H04W 52/0293 455/574 |
| 8,843,173 B2* | 9/2014 | Lee | .......... | G06F 1/3206 345/158 |
| 8,904,218 B2* | 12/2014 | Lee | .......... | G06F 1/3206 345/173 |
| 9,063,731 B2* | 6/2015 | Heo | .......... | G06F 1/3206 |
| 9,313,740 B2* | 4/2016 | Wadman | .......... | H04W 52/0235 |
| 2010/0313050 A1* | 12/2010 | Harrat | .......... | G06F 1/3203 713/323 |
| 2012/0100895 A1* | 4/2012 | Priyantha | .......... | H04W 52/0293 455/574 |
| 2014/0156269 A1* | 6/2014 | Lee | .......... | G06F 1/3206 704/231 |

(Continued)

FOREIGN PATENT DOCUMENTS

CN  104115118 A  10/2014
TW  201132107 A1  9/2011

(Continued)

*Primary Examiner* — M Elamin
(74) *Attorney, Agent, or Firm* — Birch, Stewart, Kolasch & Birch, LLP

(57) ABSTRACT

A portable electronic device includes a power management unit, a sense module, a receiver module and an application processor. The sense module powered by a first operating voltage from the power management unit provides a first control signal in response to a sense event when the portable electronic device is in a sleep mode. The receiver module is powered by a second operating voltage from the power management unit in response to the first control signal. When the receiver module is powered by the second operating voltage, the receiver module obtains and recognizes an input event and provides a second control signal when the input event is recognized. The application processor is powered by a third operating voltage from the power management unit in response to the second control signal.

19 Claims, 7 Drawing Sheets

(56) References Cited

U.S. PATENT DOCUMENTS

| | | | | |
|---|---|---|---|---|
| 2015/0103034 A1* | 4/2015 | Shepelev | ............. | G06F 3/0416 345/174 |
| 2015/0103224 A1* | 4/2015 | Min | ................. | H04N 5/23241 348/333.13 |
| 2015/0139051 A1* | 5/2015 | Gonia | ............... | H04W 52/0209 370/311 |

FOREIGN PATENT DOCUMENTS

| | | | |
|---|---|---|---|
| TW | 201421227 A | 6/2014 |
| TW | 201428626 A | 7/2014 |
| TW | 201439932 A | 10/2014 |

\* cited by examiner

PORTABLE ELECTRONIC DEVICE AND POWER CONTROL METHOD THEREFOR

BACKGROUND OF THE INVENTION

Field of the Invention

The invention relates to a portable electronic device, and more particularly to a power control method for a portable electronic device.

Description of the Related Art

Along with the continuous development of the technology, portable electronic devices, such as smart phones, tablet PCs and so on, have integrated a greater number of functions. In addition to functions such as making calls and sending/receiving messages, other functions such as displaying multimedia files, surfing the Internet and receiving/sending e-mails also have become basic functions of the portable electronic devices in the current market. Multiple functions not only can facilitate people's lives but also can provide entertainment, and thus portable electronic devices have become the most popular high-tech electronic products in the current market.

Generally, portable electronic devices are intended for use away from home and office. Under such circumstances, where there is no external power supply available to the portable electronic device, the only power source available to the portable electronic device is the battery installed in the portable electronic device. Accordingly, power management is one of the most important issues for portable electronic devices.

Therefore, it is desired to decrease the power consumption of a portable electronic device in a sleep mode.

BRIEF SUMMARY OF THE INVENTION

A portable electronic device and a power control method thereof are provided. An embodiment of a portable electronic device is provided. The portable electronic device comprises a power management unit, a sense module, a receiver module and an application processor. The power management unit is configured to provide a first operating voltage, a second operating voltage and a third operating voltage. The sense module is powered by the first operating voltage and configured to obtain a sense event and provide a first control signal in response to the sense event when the portable electronic device is in a sleep mode. The receiver module is powered by the second operating voltage in response to the first control signal. When the receiver module is powered by the second operating voltage, the receiver module is configured to obtain and recognize an input event and to provide a second control signal when the input event is recognized. The application processor powered by the third operating voltage in response to the second control signal.

Furthermore, an embodiment of a power control method for a portable electronic device is provided, wherein the portable electronic device comprises a sense module, a receiver module and an application processor. Firstly, a first operating voltage is provided to power the sense module. A first control signal is provided by the sense module in response to a sense event when the portable electronic device is in a sleep mode. Then, a second operating voltage is provided to power the receiver module in response to the first control signal. Afterwards, the receiver module obtains and recognizes an input event and provides a second control signal when the input event is recognized. Finally, a third operating voltage is provided to power the application processor in response to the second control signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
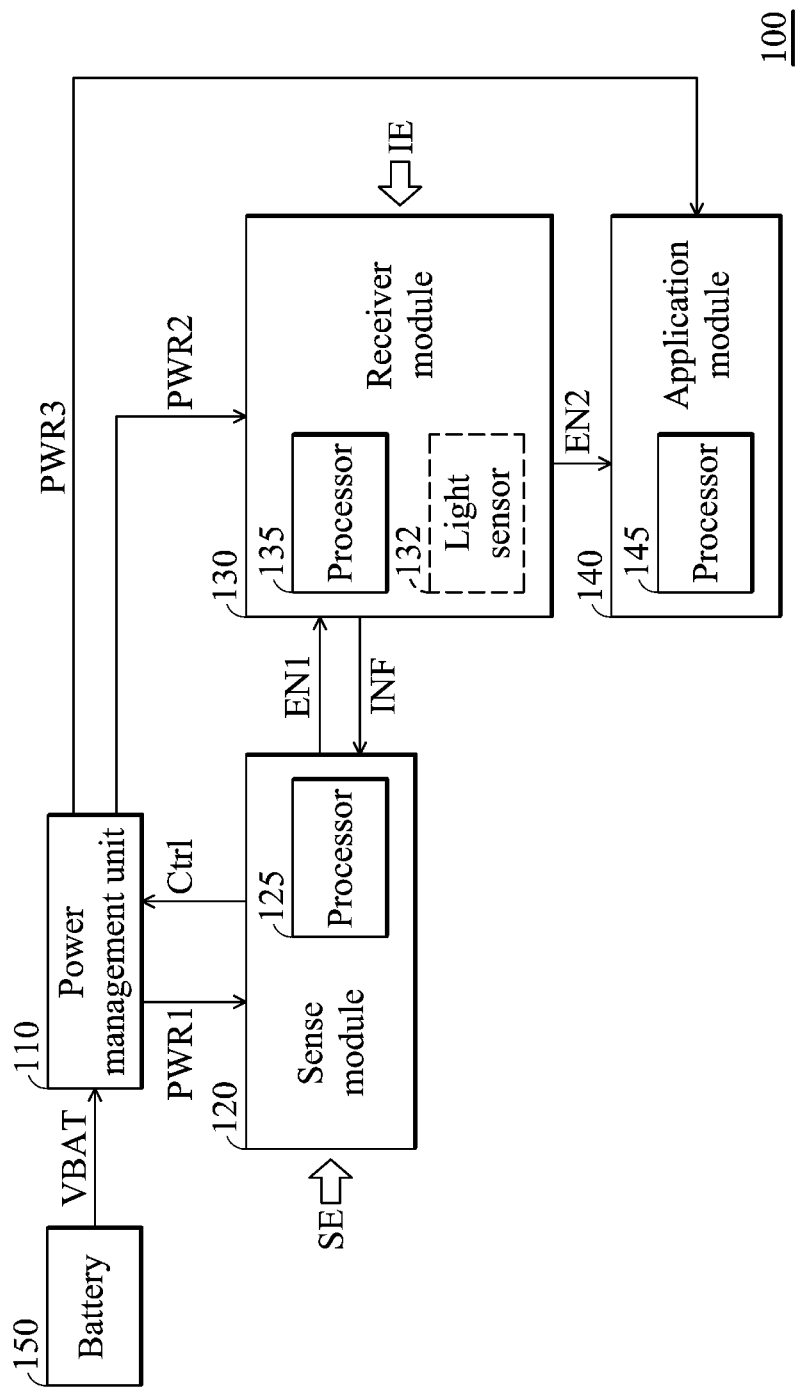
FIG. 1 shows a portable electronic device according to an embodiment of the invention.

FIG. 1 shows a portable electronic device 100 according to an embodiment of the invention. The portable electronic device 100 comprises a power management unit 110, a sense module 120, a receiver module 130, an application module 140 and a battery 150. In the embodiment, the power management unit 110 is a power management integrated circuit (PMIC). In FIG. 1, each module has a processor for performing the corresponding procedures and communicating with other modules. For example, the sense module 120 comprises a processor 125, wherein the processor 125 provides a control signal EN1 to the receiver module 130 according to a sense event SE and also provides a control signal Ctrl to the power management unit 110 according to the sense event SE and a control signal INF from the receiver module 130. Furthermore, the receiver module 130 comprises a processor 135, wherein the processor 135 obtains an input event IE when the receiver module 130 is enabled by the control signal EN1 from the sense module 120. Moreover, the processor 135 provides the control signal INF to the sense module 120 and a control signal EN2 to the application module 140 in response to the input event IE. The application module 140 comprises a processor 145 for performing a specific application corresponding to the input event IE when the application module 140 is enabled by the control signal EN2 from the receiver module 130. When the portable electronic device 100 is operated in a sleep mode, only the sense module 120 is always powered on by an operating voltage PWR1 from the power management unit 110. Furthermore, according to the control signal Ctrl from the sense module 120 and a battery voltage VBAT from the battery 150, the power management unit 110 is able to separately provide an operating voltage PWR2 to power the receiver module 130, and an operating voltage PWR3 to power the application module 140 when the portable electronic device 100 is operated in the sleep mode. In one embodiment, the processors 125, 135 and 145 may be integrated in a central processing unit (CPU).

Figure 2:
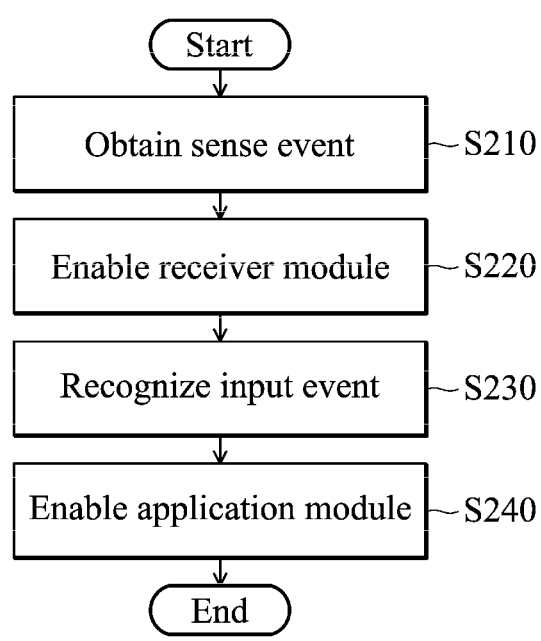
FIG. 2 shows a power control method of a portable electronic device according to an embodiment of the invention.

FIG. 2 shows a power control method for a portable electronic device according to an embodiment of the invention. Referring to FIG. 1 and FIG. 2 together, first, in step S210, the processor 125 of the sense module 120 obtains the sense event SE. Next, in step S220, the sense module 120 provides the control signal Ctrl to the power management unit 110 in response to the sense event SE, such that the power management unit 110 provides the operating voltage PWR2 to power the receiver module 130. Furthermore, the sense module 120 also provides the control signal EN1 to enable the receiver module 130, so as to obtain the input event IE. In this embodiment, obtaining the input event IE may be detecting or sensing the input event IE. Next, in step S230, the processor 135 of the receiver module 130 recognizes the input event IE and provides the control signal INF to notify the sense module 120. Next, in step S240, the sense module 120 provides the control signal Ctrl to the power management unit 110 according to the control signal INF, so as to provide the operating voltage PWR3 to power the application module 140. Simultaneously, the processor 135 provides the control signal EN2 to enable the application module 140 (step S240). Thus, the power management unit 110 can provide the operating voltages PWR2 and PWR3 according to the sense event SE and the input event IE when the portable electronic device 100 is operated in the sleep mode. In other words, when no sense event SE is obtained by the sense module 120, only the operating voltage PWR1 is provided to the sense module 120, thus power consumption is decreased for the portable electronic device 100. Therefore, the efficiency of the battery 150 is improved and the lifetime of the battery 150 is extended.

Figure 3:
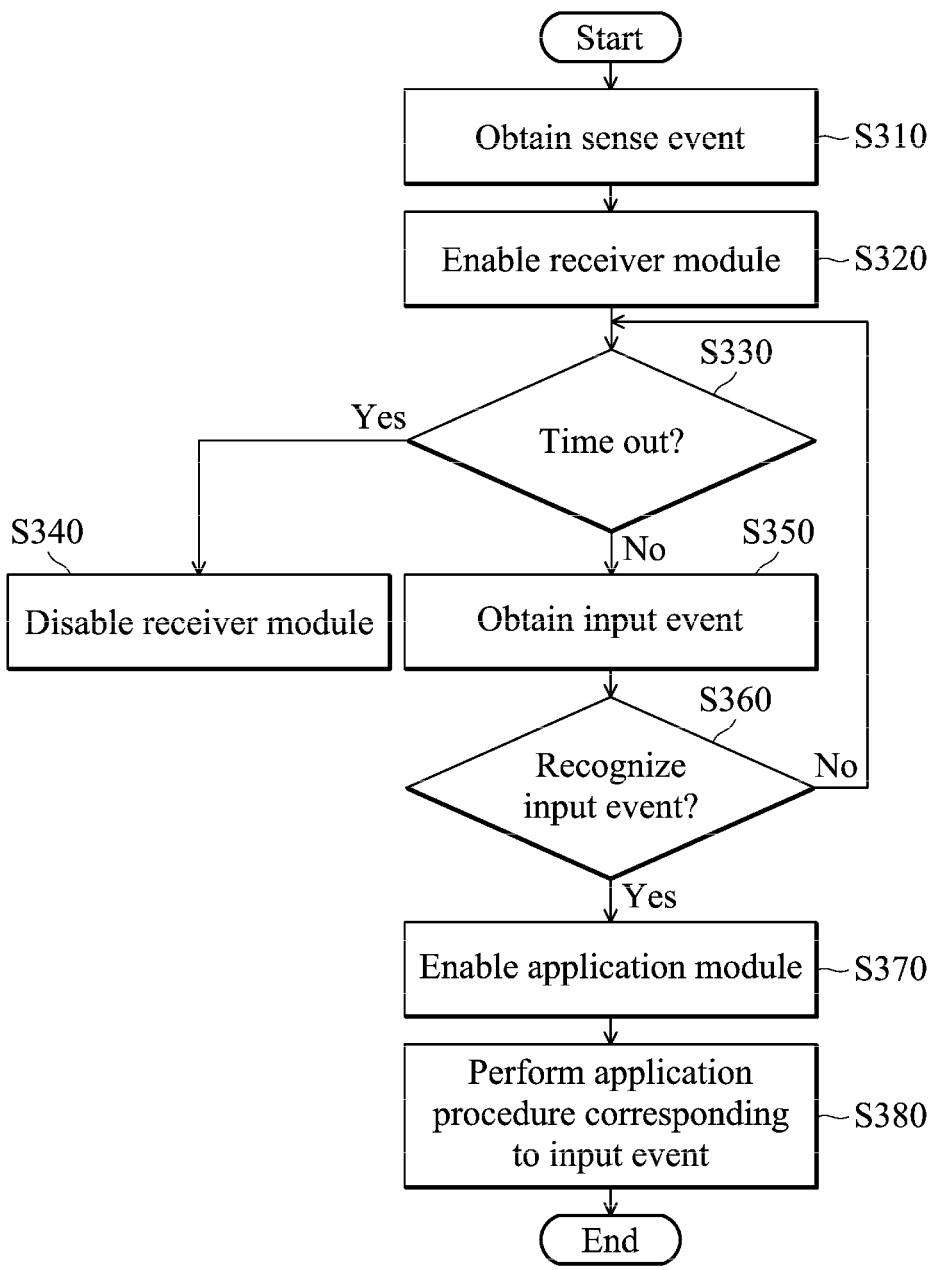
FIG. 3 shows a power control method of a portable electronic device according to another embodiment of the invention.

FIG. 3 shows a power control method for a portable electronic device according to another embodiment of the invention. Referring to FIG. 1 and FIG. 3 together, first, in step S310, the processor 125 of the sense module 120 obtains the sense event SE. Next, in step S320, the sense module 120 provides the control signal Ctrl to the power management unit 110 in response to the sense event SE, such that the power management unit 110 provides the operating voltage PWR2 to power the receiver module 130. Furthermore, the sense module 120 also provides the control signal EN1 to enable the receiver module 130. Next, in step S330, the processor 135 of the receiver module 130 activates a timer to perform a time-out procedure. If no input event IE is obtained during the time-out procedure, the receiver module 130 provides the control signal INF to notify the processor 125 of the sense module 120. Thus, the sense module 120 provides the control signal Ctrl to the power management unit 110 in response to the control signal INF, such that the power management unit 110 stops providing the operating voltage PWR2 to the receiver module 130. Simultaneously, the sense module 120 also provides the control signal EN1 to disable the receiver module 130 (step S340). If the input event IE is obtained during the time-out procedure, the receiver module 130 obtains the input event IE (step S350). Next, in step S360, the processor 135 recognizes the input event IE. If the input event IE cannot be recognized, the processor 135 of the receiver module 130 performs the time-out procedure again (step S330). Conversely, if the input event IE is recognized, the receiver module 130 provides the control signal INF to notify the processor 125 of the sense module 120. Next, the sense module 120 provides the control signal Ctrl to the power management unit 110 in response to the control signal INF, such that the power management unit 110 further provides the operating voltage PWR3 to power the application module 140. Simultaneously, the processor 135 also provides the control signal EN2 to enable the application module 140 (step S370). Thus, the processor 145 of the application module 140 can perform an application procedure corresponding to the input event IE (step S380). When no sense event SE is obtained by the sense module 120, only the operating voltage PWR1 is provided by the power management unit 110 to the sense module 120. Furthermore, when no input event IE is obtained by the receiver module 130, the operating voltage PWR3 will not be provided by the power management unit 110 to the application module 140. Thus, power consumption is decreased for the portable electronic device 100. Therefore, the efficiency of the battery 150 is improved and the lifetime of the battery 150 is extended.

Figure 4:
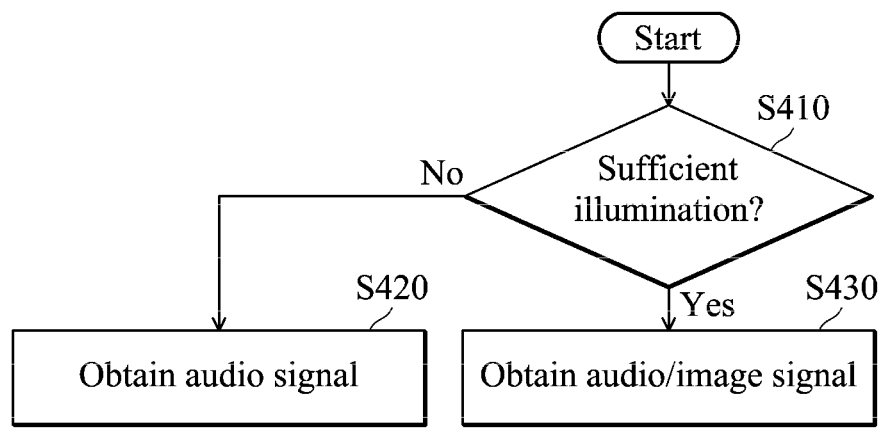
FIG. 4 shows a flow chart illustrating how to obtain the input event IE for the portable electronic device of FIG. 1 according to an embodiment of the invention.

FIG. 4 shows a flow chart illustrating how to obtain the input event IE for the portable electronic device 100 of FIG. 1 according to an embodiment of the invention. Referring to FIG. 1 and FIG. 4 together, the receiver module 130 further comprises a light sensor 132 for detecting illumination for the portable electronic device 100. When the receiver module 130 is enabled by the sense module 120, the processor 135 determines whether the illumination is sufficient by checking whether the illumination obtained by the light sensor 132 is larger than a specific value (e.g. 10 LUX) (step S410). If the illumination is smaller than or equal to the specific value (i.e. the illumination is insufficient to capture an image), the processor 135 determines that the input event IE is obtained when an audio signal is received by the receiver module 130 (step S420). Conversely, if the illumination is larger than the specific value (i.e. the illumination is sufficient to capture an image), the processor 135 determines that the input event IE is obtained when an audio signal or an image signal is received by the receiver module 130 (step S430).

Figure 5:
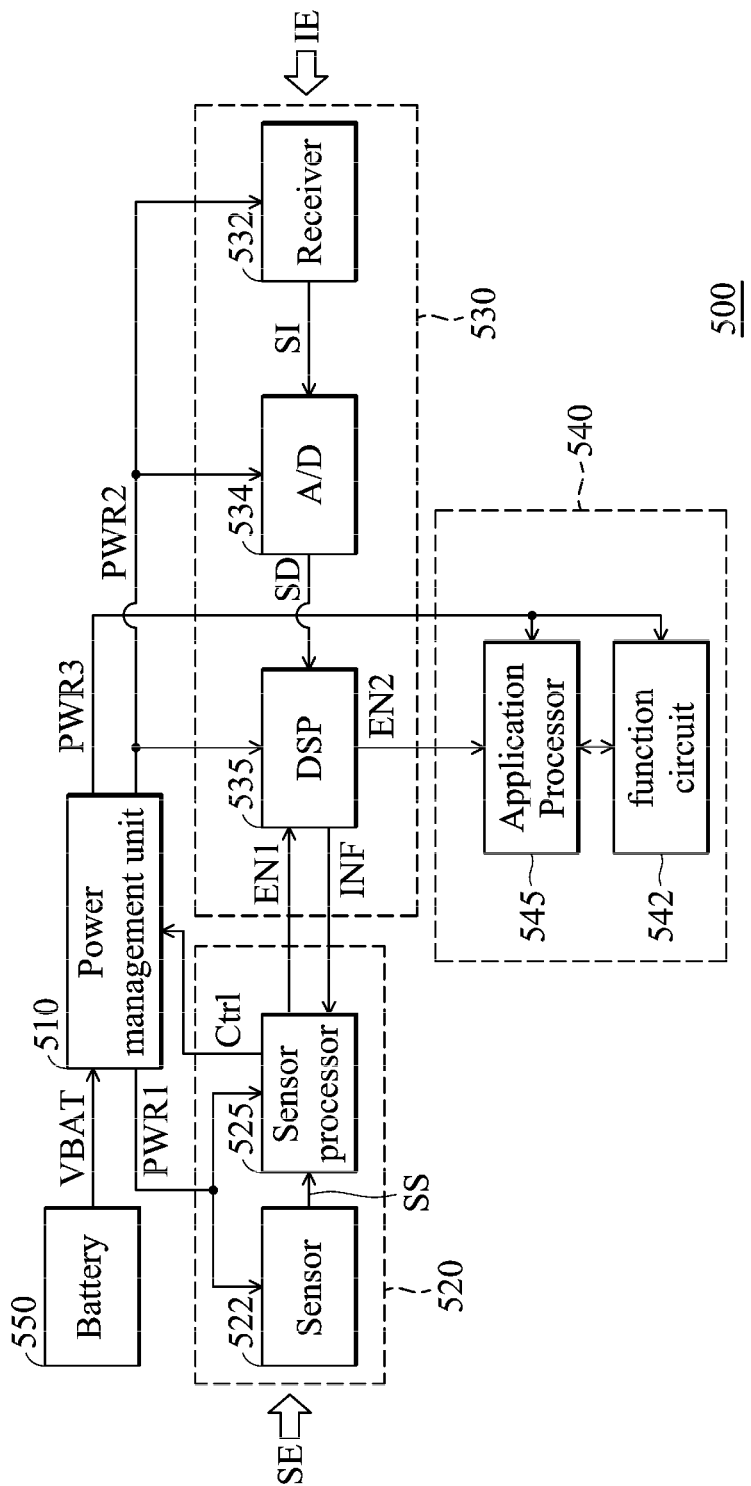
FIG. 5 shows a portable electronic device according to another embodiment of the invention.

FIG. 5 shows a portable electronic device 500 according to another embodiment of the invention. The portable electronic device 500 comprises a power management unit 510, a sense module 520, a receiver module 530, an application module 540 and a battery 550. According to a battery voltage VBAT from the battery 550 and a control signal Ctrl from the sense module 520, the power management unit 510 can separately provide the operating voltages PWR1, PWR2 and PWR3 to the sense module 520, the receiver module 530 and the application module 540. The sense module 520 comprises a sensor 522 and a sensor processor 525, wherein the power management unit 510 provides the operating voltage PWR1 to power the sensor 522 and the sensor processor 525 when the portable electronic device 500 is operated in a sleep mode. The sensor 522 provides a sense signal SS to the sensor processor 525 according to a sense event SE. In one embodiment, the sensor 522 is a motion sensor for detecting movement of the portable electronic device 500, thus the sensor 522 generates the sense signal SS when it detects that the position of the portable electronic device 500 changes (i.e. the sense event SE). In another embodiment, the sensor 522 is a touch sensor for detecting a touch of an object, e.g. a finger or a stylus, thus the sensor 522 generates the sense signal SS when it detects that a touch of an object is generated on the sensor 522. The sensor processor 525 provides the control signal Ctrl to the power management unit 510 according to the sense signal SS, so as to control the power management unit 510 to provide the operating voltage PWR2 to the receiver module 530. The receiver module 530 comprises a receiver 532, an analog to digital converter (ADC) 534 and a digital signal processor (DSP) 535, wherein the receiver 532, the ADC 534 and the DSP 535 are powered by the operating voltage PWR2. In the embodiment, the receiver 532 may be a microphone for receiving a voice command. When the operating voltage PWR2 is provided by the power management unit 510, the sensor processor 525 of the sense module 520 provides a control signal EN1 to enable the receiver module 530. In the embodiment, the input event IE may be a voice command. If the input event IE is obtained, the receiver 532 provides an input signal SI to the ADC 534 according to the input event IE. Next, the ADC 534 converts the input signal SI into a digital signal SD. In response to the control signal EN1, the DSP 535 activates a timer to perform a time-out procedure. When the DSP 535 receives the digital signal SD during the time-out procedure, the DSP 535 determines whether the digital signal SD comprises a voice command. If the digital signal SD comprises the voice command, the DSP 535 provides a control signal INF to notify the sense module 520. Next, the sensor processor 525 provides the control signal Ctrl to the power management unit 510 according to the control signal INF, so as to control the power management unit 510 to provide the operating voltage PWR3 to the application module 540. The application module 540 comprises a function circuit 542 and an application processor 545, wherein the function circuit 542 and the application processor 545 are powered by the operating voltage PWR3. When the operating voltage PWR3 is provided by the power management unit 510 to the application module 540, the DSP 535 of the receiver module 530 further provides a control signal EN2 to enable the application module 540. After the application module 540 is enabled, the application processor 545 can perform an application procedure (such as dialing, opening E-mail, playing a multimedia file and so on) corresponding to the voice command by using the function circuit 542, wherein the voice command is set and stored in a memory of the portable electronic device 500 in advance. In this embodiment, the function circuit 542, for example, may be a wireless communication circuit for dialing function or an audio playing circuit for playing a multimedia file. Thus, the portable electronic device 500 enters an active mode, for performing the application procedure, from the sleep mode. On the other hand, when the DSP 535 does not receive the digital signal SD during the time-out procedure, the DSP 535 provides the control signal INF to notify the sensor processor 525 of the sense module 520. Next, the sensor processor 525 provides the control signal Ctrl to the power management unit 510 according to the control signal INF, so as to control the power management unit 510 to stop providing the operating voltage PWR2 to the receiver module 530. Thus, the portable electronic device 500 stays in the sleep mode with less power consumption due to no operating voltages PWR2 and PWR3 being provided.

Figure 6:
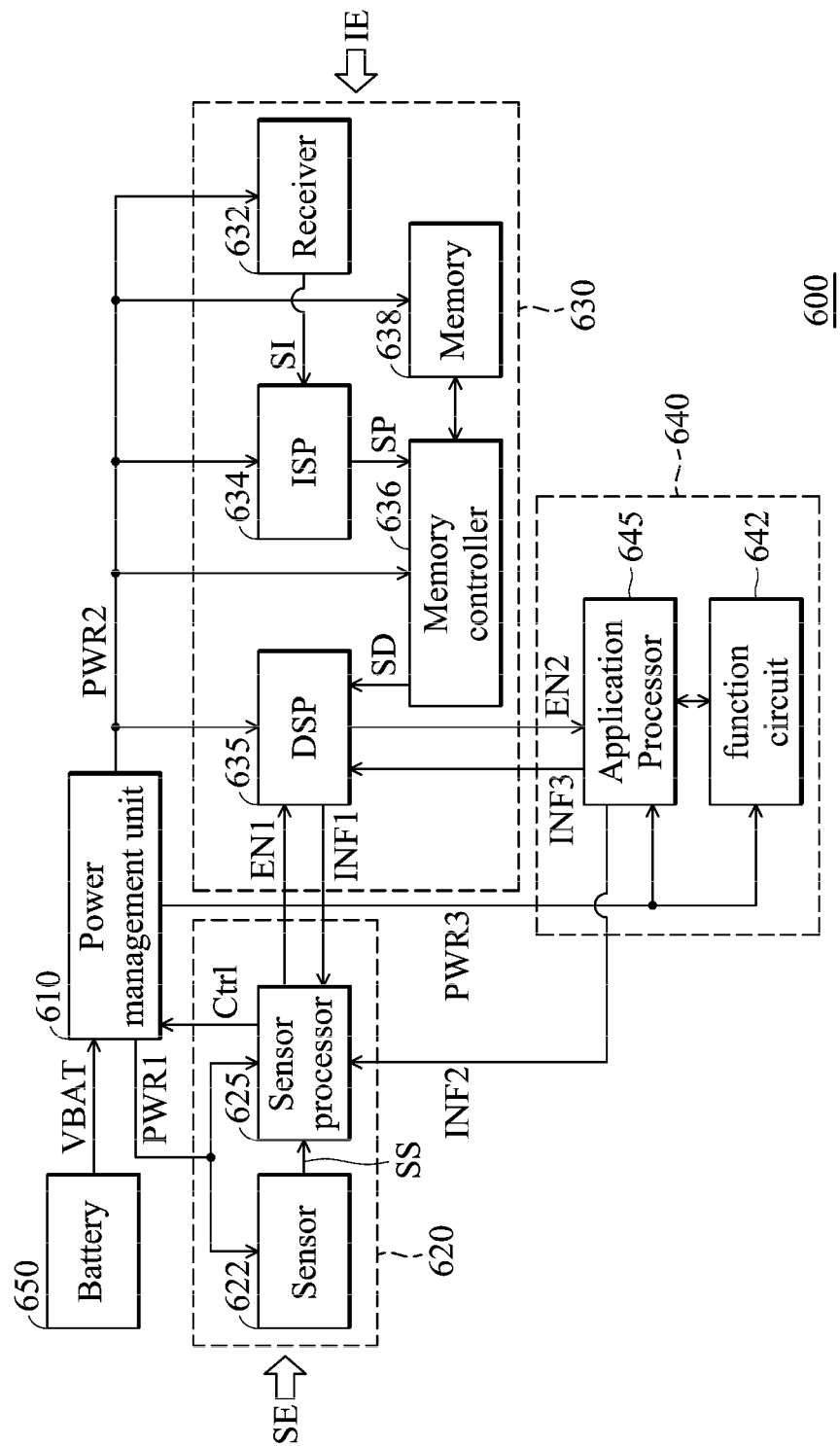
FIG. 6 shows a portable electronic device according to another embodiment of the invention.

FIG. 6 shows a portable electronic device 600 according to another embodiment of the invention. The portable electronic device 600 comprises a power management unit 610, a sense module 620, a receiver module 630, an application module 640 and a battery 650. According to a battery voltage VBAT from the battery 650 and a control signal Ctrl from the sense module 620, the power management unit 610 can separately provide the operating voltages PWR1, PWR2 and PWR3 to the sense module 620, the receiver module 630 and the application module 640. The sense module 620 comprises a sensor 622 and a sensor processor 625, wherein the power management unit 610 provides the operating voltage PWR1 to power the sensor 622 and the sensor processor 625 when the portable electronic device 600 is operated in a sleep mode. The sensor 622 provides a sense signal SS to the sensor processor 625 according to a sense event SE. As described above, the sensor 622 may be a motion sensor or a touch sensor. The sensor processor 625 provides the control signal Ctrl to the power management unit 610, so as to control the power management unit 610 to provide the operating voltage PWR2 to the receiver module 630. The receiver module 630 comprises a receiver 632, an image signal processor (ISP) 634, a DSP 635, a memory controller 636 and a memory 638, wherein the receiver 632, the ISP 634, the DSP 635, the memory controller 636 and the memory 638 are powered by the operating voltage PWR2. In the embodiment, the receiver 632 may be a camera for capturing images. When the operating voltage PWR2 is provided by the power management unit 610, the sensor processor 625 of the sense module 620 provides a control signal EN1 to enable the receiver module 630. In the embodiment, the input event IE may be an image, e.g. an image of a user's face. If the input event IE is obtained, the receiver 632 provides an input signal SI to the ISP 634 according to the input event IE. Next, the ISP 634 provides an image data SP to the memory controller 636 according to the input signal SI. The memory controller 636 receives the image data SP and writes the image data SP to the memory 638, and the DSP 635 will read a digital signal SD corresponding to the image data SP from the memory 638 through the memory controller 636. As described above, the DSP 635 activates a timer to perform a time-out procedure in response to the control signal EN1. When the DSP 635 receives the digital signal SD during the time-out procedure, the DSP 635 determines whether the digital signal SD comprises a facial image, i.e. an image of a user's face. If the digital signal SD comprises the facial image, the DSP 635 provides a control signal INF1 to notify the sense module 620. Next, the sensor processor 625 provides the control signal Ctrl to the power management unit 610 according to the control signal INF1, so as to control the power management unit 610 to provide the operating voltage PWR3 to the application module 640. The application module 640 comprises a function circuit 642 and an application processor 645, wherein the function circuit 642 and the application processor 645 are powered by the operating voltage PWR3. When the operating voltage PWR3 is provided by the power management unit 610 to the application module 640, the DSP 635 of the receiver module 630 further provides a control signal EN2 to enable the application module 640. After the application module 640 is enabled, the application processor 645 can perform an unlock procedure by using the function circuit 642 in response to the facial image. If the unlock procedure is successful, the portable electronic device 600 enters an active mode directly from the sleep mode without entering a lock screen mode, in which a user needs to unlock a touch panel of the portable electronic device 600 by typing a password or sliding his/her finger or a stylus on the touch panel, so as to enter the active mode. In one embodiment, if the digital signal SD comprises a specific user's facial image, e.g. a facial image of an owner of the portable electronic device 600, the DSP 635 provides the control signal EN2 to enable and notify the application processor 645. Thus, the application processor 645 performs an unlock procedure and controls the portable electronic device 600 to enter the active mode directly from the sleep mode without entering a lock screen mode. On the other hand, when the DSP 635 does not receive the digital signal SD during the time-out procedure, the DSP 635 provides the control signal INF1 to notify the sensor processor 625 of the sense module 620. Next, the sensor processor 625 provides the control signal Ctrl to the power management unit 610 according to the control signal INF1, so as to control the power management unit 610 to stop providing the operating voltage PWR2 to the receiver module 630. Thus, the portable electronic device 600 stays in the sleep mode with less power consumption due to no operating voltages PWR2 and PWR3 being provided.

Figure 7:
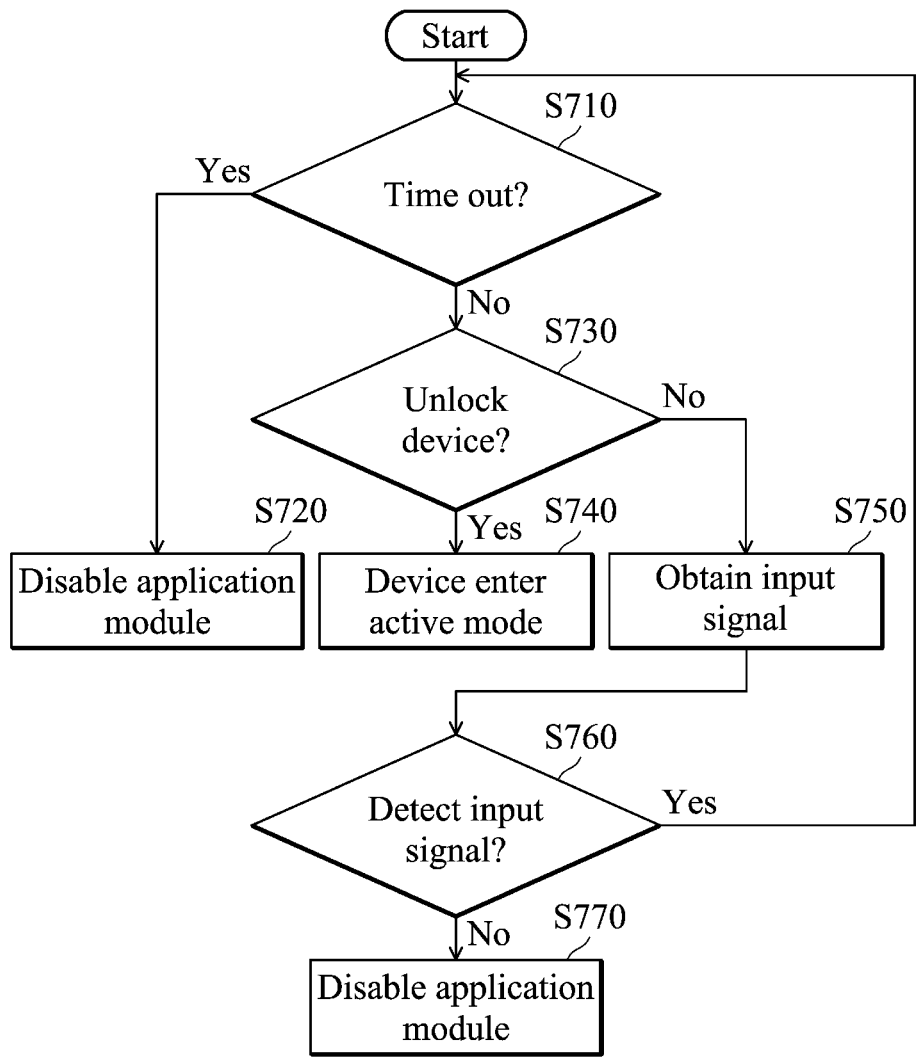
FIG. 7 shows the unlock procedure of the portable electronic device 600 according to an embodiment of the invention.

FIG. 7 shows the unlock procedure of the portable electronic device 600 according to an embodiment of the invention. Referring to FIG. 6 and FIG. 7 together, when the operating voltage PWR3 is provided by the power management unit 610 to the application module 640, the DSP 635 of the receiver module 630 provides the control signal EN2 to enable the application module 640 so that an unlock procedure can be performed by the application processor 645. In the embodiment, the function circuit 642 may be a display controlling circuit for outputting an unlock screen to be displayed on the touch panel. In this embodiment, the unlock screen includes a plurality of application icons for a user to operate. In step S710, the application processor 645 of the application module 640 activates a timer to perform a time-out procedure. If no unlock input is obtained during the time-out procedure, the application processor 645 provides a control signal INF2 to notify the sensor processor 625 of the sense module 620. Thus, the sense module 620 provides the control signal Ctrl to the power management unit 610 in response to the control signal INF2, such that the power management unit 110 stops providing the operating voltage PWR3 to the application module 640, thereby the application module 640 is disabled (step S720). If the unlock input is obtained during the time-out procedure, the application processor 645 determines whether the unlock input is correct (step S730). If the unlock input is correct, the application processor 645 controls the portable electronic device 600 to enter the active mode directly from the sleep mode (step S740) without entering a lock screen mode so that the unlock screen is outputted by the display controlling circuit to be displayed on the touch panel. Conversely, if the unlock input is incorrect, the application processor 645 provides a control signal INF3 to notify the DSP 635 of the receiver module 630. Next, the DSP 635 controls the receiver 632 to provide the current input signal SI, so as to obtain the current digital signal SD (step S750). Next, the DSP 635 determines whether the current digital signal SD comprises the facial image (step S760). If the digital signal SD comprises the facial image, the unlock procedure goes back to step S710. Conversely, if the digital signal SD does not comprise the facial image, the DSP 635 provides the control signal INF1 to notify the sensor processor 625 of the sense module 620. Thus, the sense module 620 provides the control signal Ctrl to the power management unit 610 in response to the control signal INF1, such that the power management unit 610 stops providing the operating voltage PWR3 to the application module 640. Simultaneously, the DSP 635 also provides the control signal EN2 to disable the application module 640 (step S770).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
    a power management unit configured to provide a first operating voltage, a second operating voltage and a third operating voltage;
    a sense module coupled to the power management unit, powered by the first operating voltage and configured to obtain a sense event and provide a first control signal in response to the sense event when the portable electronic device is in a sleep mode;
    a receiver module powered by the second operating voltage; and
    an application processor powered by the third operating voltage,
    wherein when the receiver module is enabled by the first control signal, the receiver module is configured to obtain and recognize an input event, and to provide a second control signal to enable the application processor when the input event is recognized,
    wherein in response to the sense event, the sense module provides a power control signal to control the power management unit, so as to provide the second operating voltage to power the receiver module, and
    wherein when the input event is recognized, the sense module provides the power control signal to control the power management unit, so as to provide the third operating voltage to power the application processor.

2. The portable electronic device as claimed in claim 1, wherein the sense module comprises:
    a sensor configured to detect the sense event and provide a sense signal according to the sense event; and
    a sensor processor coupled to the sensor and configured to provide the first control signal according to the sense signal,
    wherein the sensor and the sensor processor are powered by the first operating voltage.

3. The portable electronic device as claimed in claim 2, wherein the sensor is a motion sensor or a touch sensor.

4. The portable electronic device as claimed in claim 1, wherein the receiver module comprises:
    a microphone configured to obtain the input event and provide an input signal according to the input event, wherein the input event is a voice command;
    an analog to digital converter configured to convert the input signal into a digital signal; and
    a digital signal processor configured to determine whether the digital signal comprises the voice command and provide the second control signal to the application processor when the digital signal comprises the voice command,
    wherein the microphone, the analog to digital converter and the digital signal processor are powered by the second operating voltage.

5. The portable electronic device as claimed in claim 4, wherein the application processor is configured to perform an application procedure corresponding to the voice command.

6. The portable electronic device as claimed in claim 1, wherein the receiver module comprises:
    a camera configured to obtain the input event and provide an input signal according to the input event, wherein the input event is an image;
    an image signal processor configured to provide image data according to the input signal; and a digital signal processor configured to determine whether the image data comprises a facial image and provide the second control signal to the application processor when the image data comprises the facial image, wherein the image capturing device, the image signal processor and the digital signal processor are powered by the second operating voltage.

7. The portable electronic device as claimed in claim 6, wherein the application processor is configured to perform an unlock procedure when the facial image is a specific user's facial image.

8. The portable electronic device as claimed in claim 6, wherein when the facial image is a specific user's facial image, the portable electronic device enters an active mode directly from the sleep mode.

9. The portable electronic device as claimed in claim 1, wherein when no input event is obtained by the receiver module, the sense module controls the power management unit to stop proving the second operating voltage.

10. The portable electronic device as claimed in claim 1, wherein the receiver module further comprises a light sensor for detecting illumination, a microphone for detecting a voice command and a camera for detecting an image, wherein an audio signal is provided by the microphone according to the voice command when the sense module detects that the illumination is smaller than or equal to a specific lux, and wherein an image signal is provided by the camera according to the image when the sense module detects that the illumination is larger than the specific lux.

11. A power control method of a portable electronic device, wherein the portable electronic device comprises a sense module, a receiver module and an application processor, comprising:

providing a first operating voltage to power the sense module;

providing a first control signal to enable the receiver module by the sense module in response to a sense event when the portable electronic device is in a sleep mode;

providing a second operating voltage to power the receiver module according to a power control signal, wherein the sense module provides the power control signal in response to the sense event;

obtaining and recognizing an input event by the receiver module and providing a second control signal to enable the application processor by the receiver module when the input event is recognized; and providing a third operating voltage to power the application processor according to the power control signal, wherein the sense module provides the power control signal when the input event is recognized.

12. The power control method as claimed in claim 11, wherein the sense module further comprises a sensor and a sensor processor, and the method further comprises:

detecting the sense event and providing a sense signal according to the sense event by the sensor; and providing the first control signal according to the sense signal by the sensor processor, wherein the sensor and the sensor processor are powered by the first operating voltage.

13. The power control method as claimed in claim 12, wherein the sensor is a motion sensor or a touch sensor.

14. The power control method as claimed in claim 11, wherein the receiver module further comprises a microphone, an analog to digital converter and a digital signal processor, and the method further comprises:

obtaining the input event and providing an input signal according to the input event by the microphone, wherein the input event is a voice command;

converting the input signal into a digital signal by the analog to digital converter;

determining whether the digital signal comprises the voice command by the digital signal processor; and providing the second control signal to the application processor by the digital signal processor when the digital signal comprises the voice command, wherein the microphone, the analog to digital converter and the digital signal processor are powered by the second operating voltage.

15. The power control method as claimed in claim 14, further comprising:

performing an application procedure corresponding to the voice command by the application processor.

16. The power control method as claimed in claim 11, wherein the receiver module further comprises a camera, an image signal processor and a digital signal processor, and the method further comprises:

obtaining the input event and providing an input signal according to the input event by the camera, wherein the input event is an image;

providing an image data according to the input signal by the image signal processor;

determining whether the image data comprises a facial image by the digital signal processor; and providing the second control signal to the application processor by the digital signal processor when the image data comprises the facial image, wherein the image capturing device, the image signal processor and the digital signal processor are powered by the second operating voltage.

17. The power control method as claimed in claim 16, further comprising performing an unlock procedure by the application processor when the facial image is a specific user's facial image.

18. The power control method as claimed in claim 16, wherein when the facial image is a specific user facial image, the portable electronic device enters an active mode directly from the sleep mode.

19. The power control method as claimed in claim 11, further comprising:

stopping providing the second operating voltage when no input event is obtained by the receiver module.

* * * * *